United States Patent
Akiyama et al.

(10) Patent No.: US 7,590,241 B2
(45) Date of Patent: Sep. 15, 2009

(54) RECEIVER AND RECEIVING METHOD

(75) Inventors: Hitoshi Akiyama, Yokohama (JP); Katsuhiko Tonami, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 789 days.

(21) Appl. No.: 11/061,746

(22) Filed: Feb. 22, 2005

(65) Prior Publication Data

US 2006/0023881 A1 Feb. 2, 2006

(30) Foreign Application Priority Data

Jul. 27, 2004 (JP) .............................. 2004-218045

(51) Int. Cl.
*G06F 7/04* (2006.01)
*G06F 17/30* (2006.01)
*G06K 9/00* (2006.01)
*H03M 1/68* (2006.01)
*H04K 1/00* (2006.01)
*H04L 9/00* (2006.01)
*H04L 9/32* (2006.01)
*H04N 7/16* (2006.01)
*B41K 3/38* (2006.01)
*H04N 7/167* (2006.01)

(52) U.S. Cl. .................. 380/210; 380/59; 380/201; 380/216; 380/239; 713/168; 726/26

(58) Field of Classification Search ............. None
See application file for complete search history.

(56) References Cited

U.S. PATENT DOCUMENTS 5,757,909 A * 5/1998 Park ........................ 380/201

FOREIGN PATENT DOCUMENTS

| JP | 08-237634 | 9/1996 |
| JP | 2001-160961 | 6/2001 |

OTHER PUBLICATIONS

Ralph Brown, et al; OC-SP-CC-IF-I16-040402; OpenCable™ CableCARD™ Interface Specification; *"CableLabs"*; c. 2000-2004; Cable Television Laboratories, Inc.

* cited by examiner

*Primary Examiner*—Nasser G Moazzami
*Assistant Examiner*—Oscar A Louie
(74) *Attorney, Agent, or Firm*—McDermott Will & Emery LLP

(57) ABSTRACT

When a channel which is not scrambled is selected, an error occurs in a digital stream processed in a CA processing module, which causes noises to occur in video and audio signals to be viewed. If a FAT channel to be received is a channel that is not CA-scrambled, a digital stream is directly supplied from a FAT demodulator to a demultiplexer without passing the digital stream through an external processing module. As a result, no noise occurs in video and audio signals to be viewed because the video and audio signals are not influenced by an error of the digital stream that occurs in the processing module.

18 Claims, 5 Drawing Sheets

RECEIVER AND RECEIVING METHOD

CLAIMS OF PRIORITY

The present application claims priority from Japanese application serial no. JP2004-218045, filed on Jul. 27, 2004, the content of which is hereby incorporated by reference into this application.

BACKGROUND OF THE INVENTION (1) Field of the Invention

The present invention relates to a digital receiver that receives a digital-modulated transmitted wave.

(2) Description of the Related Art

In recent years, the digitization of CATV broadcasts is being promoted. Video and audio signals are usually encoded by a digital encoding method, such as MPEG (Motion Picture Experts Group), to generate a digital stream, which is transmitted by a digital modulation method. In addition, with the object of bringing a pay broadcast into operation, a digital stream is scrambled on the transmitting station side. More specifically, the digital stream is encrypted. By performing descramble processing to decrypt the digital stream on the receiver side, only persons who hold a contract can view the broadcast. This is how a system is configured. This scrambling/descrambling method is called CA (Conditional Access). Because CATV broadcasting companies can individually adopt an arbitrary CA method, a broadcast transmitted by each broadcasting company can be received only by receivers including CA corresponding to the broadcasting company in question. Therefore, if the CATV broadcasting company is changed, the receiver therefor also needs to be changed to a receiver that includes CA corresponding to the new broadcasting company. Taking such situations into consideration, what is being developed is a technology in which instead of including CA in a receiver, the CA is configured as an external processing module that can be replaced. For example, in the standards disclosed in Open Cable (TM) Cable CARD (TM) Interface Specification OC-SP-CC-IF-116-040402, Cable Television Laboratories, Inc. 2004, replacing a processing module makes it possible to view broadcasts transmitted by each CATV broadcasting company. In the standards, CA is included in a processing module called POD (Point Of Deployment). Here, by replacing POD with that corresponding to each CATV broadcasting company, it becomes possible to view broadcasts transmitted by the CATV broadcasting company in question without changing a receiver itself.

In the above-mentioned standards that use POD, a channel which transmits from a transmitting station a digital stream to be actually viewed is called FAT (Forward Applications Transport); and QAM (Quadrature Amplitude Modulation) is used as a modulation method. In addition to the FAT channel, there is a subchannel called OOB (Out Of Band), a frequency of which differs from that of the FAT channel. This subchannel is used to transmit additional information. The OOB comprises a downstream channel called FDC (Forward Data Channel), and an upstream channel called RDC (Return Data Channel). What is transmitted from a transmitting station through the FDC includes a channel map relating to a FAT channel, and additional information such as encryption information. What is transmitted from a receiver to the transmitting station through the RDC includes information about the receiver. However, it is not always necessary to use the RDC. QPSK (Quadrature Phase Shift Keying) is used as a modulation method of FDC. A QPSK receiving circuit of FDC is required independently of a QAM receiving circuit for receiving FAT.

In the meantime, as an example of using a decryption module (POD), for example, Japanese Patent Laid-Open No. 2001-160961 discloses a configuration in which a judgment is made as to whether or not video data is scrambled, and if it is judged that the video data is not scrambled, the power supply to a descrambling unit is stopped. In other words, if descrambling is not required, the power supply to the descrambling unit is stopped so that the power consumption is reduced.

SUMMARY OF THE INVENTION

However, the above-mentioned decryption module is made on the assumption that descrambling is carried out. Accordingly, a bad influence may be exerted upon a stream of a channel that is not CA-scrambled (hereinafter referred to as "clear channel"). To be more specific, if a clear channel is selected, descramble processing which is not required for the clear channel in itself is performed. Accordingly, an error sometimes occurs in a stream supplied from the processing module to the receiver. In this case, it is impossible to correct the error on the receiver side. As a result, decoded video and audio signals may include noises. Moreover, because the decryption module is provided not by a receiver manufacturer but by a CATV company, the receiver manufacturer cannot improve the processing module so that an error does not occur in a stream.

As a solution to such problems, what is considered is to apply a technology in which scrambling judgment means of a receiver disclosed in the patent document 1 makes a judgment as to whether or not a header of video data includes scramble information, and on the basis of the information, a judgment is made as to whether the digital stream is to be passed to the decryption module or not, and the destination of the digital stream is switched according to the judgment.

However, in actual decryption modules, in addition to descrambling processing of CA-scrambled digital streams, new scramble processing is performed with the object of preventing the digital streams from being illegally copied. For example, a CA-scrambled digital stream inputted into an external module is descrambled before the digital steam is CP (Copy Protection) scrambled; to achieve copy protection. The CP-scrambled digital stream is then sent back to a receiver.

Because the CP scrambling is performed for the purpose of copy protection, all CA-scrambled streams should be in principle CP-scrambled after the CA-scrambled streams are descrambled.

However, as far as the currently used external modules are concerned, it is found out that some CA-scrambled streams cannot be CP-scrambled from the viewpoint of the performance.

Moreover, if there is a CA-scrambled stream that cannot be CP-scrambled, there also arises a problem of malfunction by the scrambling judgment means in the receiver. For example, what will be considered here is a receiver comprising scrambling judgment means for judging whether or not a stream is scrambled; switching means for switching a flow of a stream; and an external module including a CA descrambler and a CP scrambler. By use of the scrambling judgment means, a judgment is made as to whether or not the stream is to be passed through the external module.

(1) First of all, if a CA-scrambled stream is inputted, the scrambling judgment means of the receiver judges that the stream is "scrambled". Then, the switching means switches the destination of the stream so that the stream is passed to the external processing module.

(2) The external processing module CA-descrambles the stream, and then sends back to the receiver the stream that is not CP-scrambled. Properly speaking, the stream should be CP-scrambled.

(3) In principle, if the stream is CA-scrambled, regardless of whether or not the stream is CP-scrambled, the scrambling judgment means of the receiver judges that the stream is "scrambled". However, if the stream is not CP-scrambled, because the external module has descrambled the CA-scrambled stream, it is judged that the stream sent back to the receiver is "not scrambled". In the case of this example, because the stream which is not CP-scrambled is sent back to the receiver, it is judged that the stream is "not scrambled". As a result, the switching means switches the destination of the stream so that the stream is not passed to the external processing module.

(4) No stream is passed to the outside. In other words, the stream judgment means receives an unprocessed stream again. The stream judgment circuit judges again that the unprocessed stream is "scrambled". Accordingly, the process returns to (1), and eventually the process falls into an endless loop, which is the malfunction.

The above-mentioned problem arises due to the performance of the currently used external modules. It is desirable that when the receiver switches a stream, the stream be properly switched.

The present invention was devised in consideration of the conventional problems described above. An object of the present invention, therefore, is to provide a digital receiver and a receiving method, in which, for example, even if there is a copy protection function, noises do not occur in video and audio signals to be viewed depending on whether or not a stream is scrambled, and in which whether or not the stream is scrambled can be detected and thereby the stream is reliably switched.

In order to achieve the above-mentioned objects, according to one aspect of the present invention, there is provided a receiver comprising:

first receiving means for receiving a program signal;

second receiving means for receiving encryption information of the program signal;

decryption means for decrypting the received program signal;

detection means for detecting encryption information of the received program signal; and output means for selecting and outputting a broadcast signal, wherein:

on the basis of the encryption information of the program detected by the detection means, said output means outputs either a program signal that has passed through the decryption means, or a signal that has been received by the receiving means, but that has not passed through the decryption means.

As described above, according to the present invention, video and audio with little noise can be viewed.

DETAILED DESCRIPTION OF THE PREFERRED EMBODIMENT

By switching a digital stream according to whether or not the digital stream is CA-scrambled, a digital broadcast receiver which uses an external processing module can output noiseless video and audio even when a clear channel is selected. Accordingly, it is possible to view the noiseless video and audio output from the digital broadcast receiver.

First Embodiment

Figure 1:
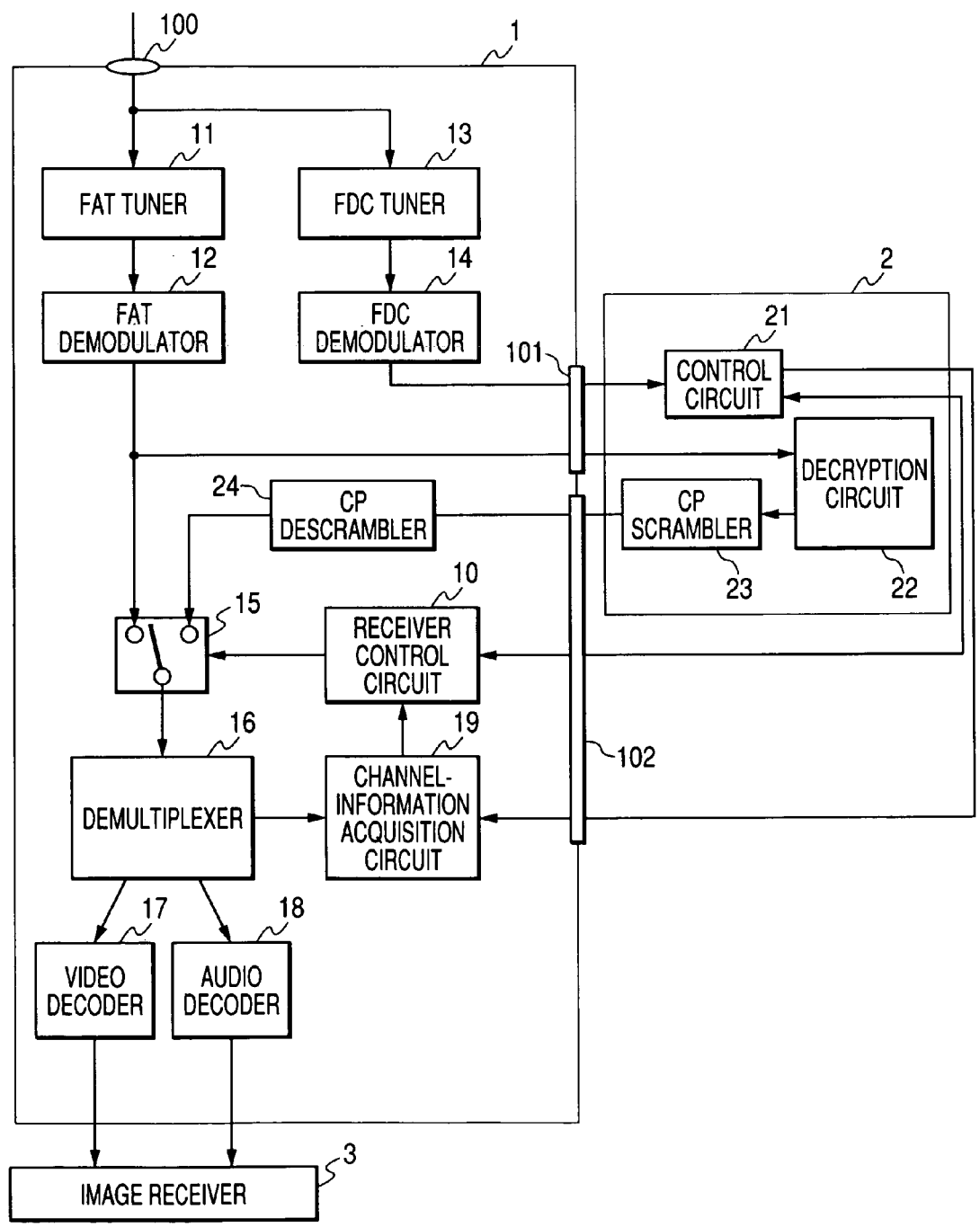
FIG. 1 is a diagram illustrating a first embodiment of the present invention.

FIG. 1 is a block diagram schematically illustrating a configuration of a digital-stream control system according to a first embodiment of the present invention. Reference numeral 1 denotes a digital receiver; and reference numeral 2 denotes an external module.

A high-frequency modulation signal including FAT and FDC is inputted into an input terminal 100, and is then supplied to a FAT tuner 11 and a FDC tuner 13. The FAT tuner 11 selects a station in response to a FAT channel frequency. A FAT demodulator 12 demodulates a selected modulated signal before a digital stream is output. In like manner, the FAT tuner 11 selects a station in response to a FDC channel frequency. The FDC demodulator 14 demodulates a selected modulated signal before FDC data is output. If a FAT channel is CA-scrambled on a transmitting station, the digital stream to be output is scrambled. From the receiver 1, the digital stream is supplied to a decryption circuit 22 of an external processing module 2 through an output unit 101. In addition to it, the digital stream is also supplied to a stream switching circuit 15.

In the processing module 2, the decryption circuit 22 performs descrambling, that is to say, decryption, in response to CA that is used by the transmitting station, and then a CP scrambler 23 performs CP scramble processing for the purpose of copy protection, and consequently a CP-scrambled digital stream is output. The digital stream is sent back again to the receiver 1 through this stream input unit 102, and is then CP-descrambled by a CP descrambler 24 before the digital stream is supplied to the stream switching circuit 15.

A receiver control circuit 10 controls the stream switching circuit 15 so that one of the two inputted digital streams is selected and the selected digital stream is then supplied to a demultiplexer 16. The digital stream includes encoded video and audio signals. The demultiplexer 16 demultiplexes the digital stream into the video and audio signals, and then supplies the signals to a video decoder 17 and an audio decoder 18. The video decoder 17 and the audio decoder 18 decode the signals, and input the video and audio signals into an image receiver 3 such as a television set. The image receiver 3 outputs the inputted video and audio signals as video and audio.

The FDC data, which has been demodulated by the FDC demodulator 14, is supplied to a control circuit 21 in the processing module 2. The FDC data is used for operation of the processing module 2, and is used to control the receiver 1. To be more specific, CA scramble information of each FAT channel is supplied to a channel-information acquisition circuit 19 where the CA scramble information is stored. As for the CA scramble information, whether or not the FAT channel is CA-scrambled is also stored.

Next, a control method for controlling the receiver control circuit 10 will be described. As soon as a user of the receiver 1 selects a FAT channel, the receiver control circuit 10 acquires, from the channel-information acquisition circuit 19, the information as to whether or not the selected FAT channel is CA-scrambled. If the channel in question is CA-scrambled, the processing module 2 CA-descrambles the channel. Then, the stream switching circuit 15 is controlled so as to select a processed digital stream output from the processing module 2.

If the channel in question is a clear channel that is not CA-scrambled, the receiver control circuit 10 controls the stream switching circuit 15 so that the digital stream which is output from the FAT demodulator 12 is selected. In this case, although the digital stream is supplied to the processing module 2, an output stream of the processing module 2 is not used by the receiver 1.

As described above, demultiplexing and decoding the digital stream selected by the stream switching circuit 15 makes it possible to view video and audio signals. At this time, if a clear channel is selected, a digital stream which does not pass through the processing module 2 is demultiplexed and decoded. Accordingly, even if an error occurs in the processing module 2, no noise occurs in video and audio to be viewed. In addition, the CA-scrambled channel can be received and viewed in a manner similar to that of the conventional receiver.

Second Embodiment

Figure 2:
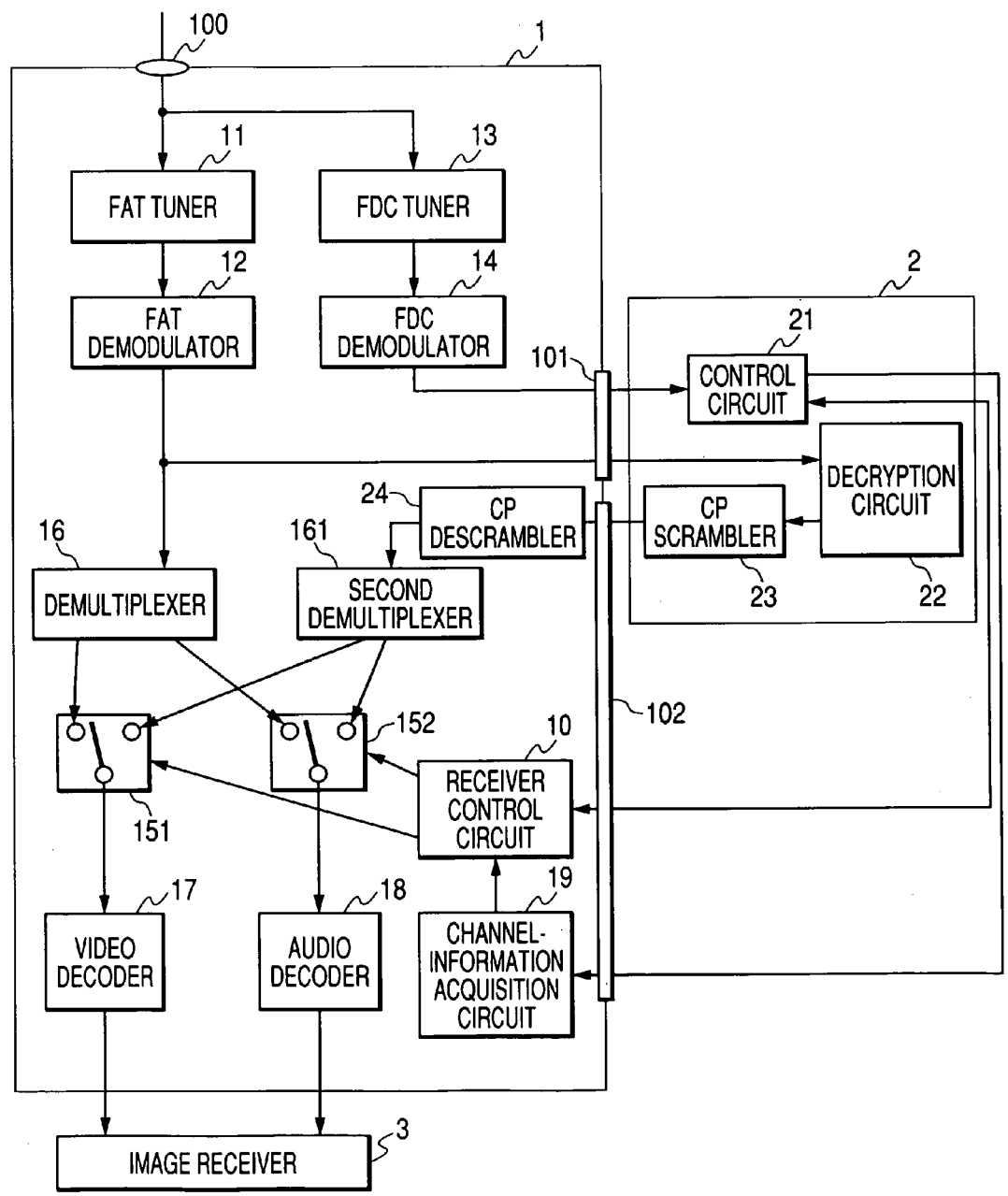
FIG. 2 is a diagram illustrating a second embodiment of the present invention.

FIG. 2 is a block diagram schematically illustrating a configuration of a digital-stream control system according to a second embodiment of the present invention. In FIG. 2, the same circuits are designated by reference numerals similar to those in FIG. 1. Reference numeral 161 denotes a second demultiplexer; reference numeral 151 denotes a video-encoded signal switching circuit; and reference numeral 152 denotes an audio-encoded signal switching circuit. A description will be made with reference to drawings as below.

The FAT tuner 11, the FAT demodulator 12, the FDC tuner 13, the FDC demodulator 14, the processing module 2, and the channel-information acquisition circuit 19 operate in a manner similar to that of the first embodiment. In the second embodiment, what is switched according to whether or not a digital stream is CA-scrambled is not the digital stream, but encoded video and audio signals, into which the digital stream is demultiplexed by a demultiplexer.

A digital stream demodulated by the FAT demodulator 12 is concurrently supplied to both a demultiplexer 16 and the processing module 2. The processing module 2 CA-descrambles the digital stream, and then supplies the stream to the second demultiplexer 161. Encoded video and audio signals, into which the demultiplexers 16 and 161 have demultiplexed the digital stream, are supplied to the video-encoded signal switching circuit 151 and the audio-encoded signal switching circuit 152. If a user selects a FAT channel, the receiver control circuit 10 acquires, from the channel-information acquisition circuit 19, information as to whether or not the FAT channel is CA-scrambled.

If the channel in question is scrambled, the receiver control circuit 10 controls the video-encoded signal switching circuit 151 and the audio-encoded signal switching circuit 152 so that a signal coming from the second demultiplexer 161 is selected.

If the channel in question is not scrambled, the receiver control circuit 10 controls the video-encoded signal switching circuit 151 and the audio-encoded signal switching circuit 152 so that a signal coming from the demultiplexer 16 is selected.

It is to be noted that some of the circuits may also be formed on the same substrate. For example, the demultiplexer 16 and the second demultiplexer 161 may also be integrated as a component having a chip shape.

As described above, if a clear channel is selected, a digital stream which does not pass through the processing module 2 is demultiplexed and decoded. Accordingly, even if an error occurs in the processing module 2, no noise occurs in video and audio to be viewed. In addition, the CA-scrambled channel can be received and viewed in a manner similar to that of the conventional receiver.

Figure 3:
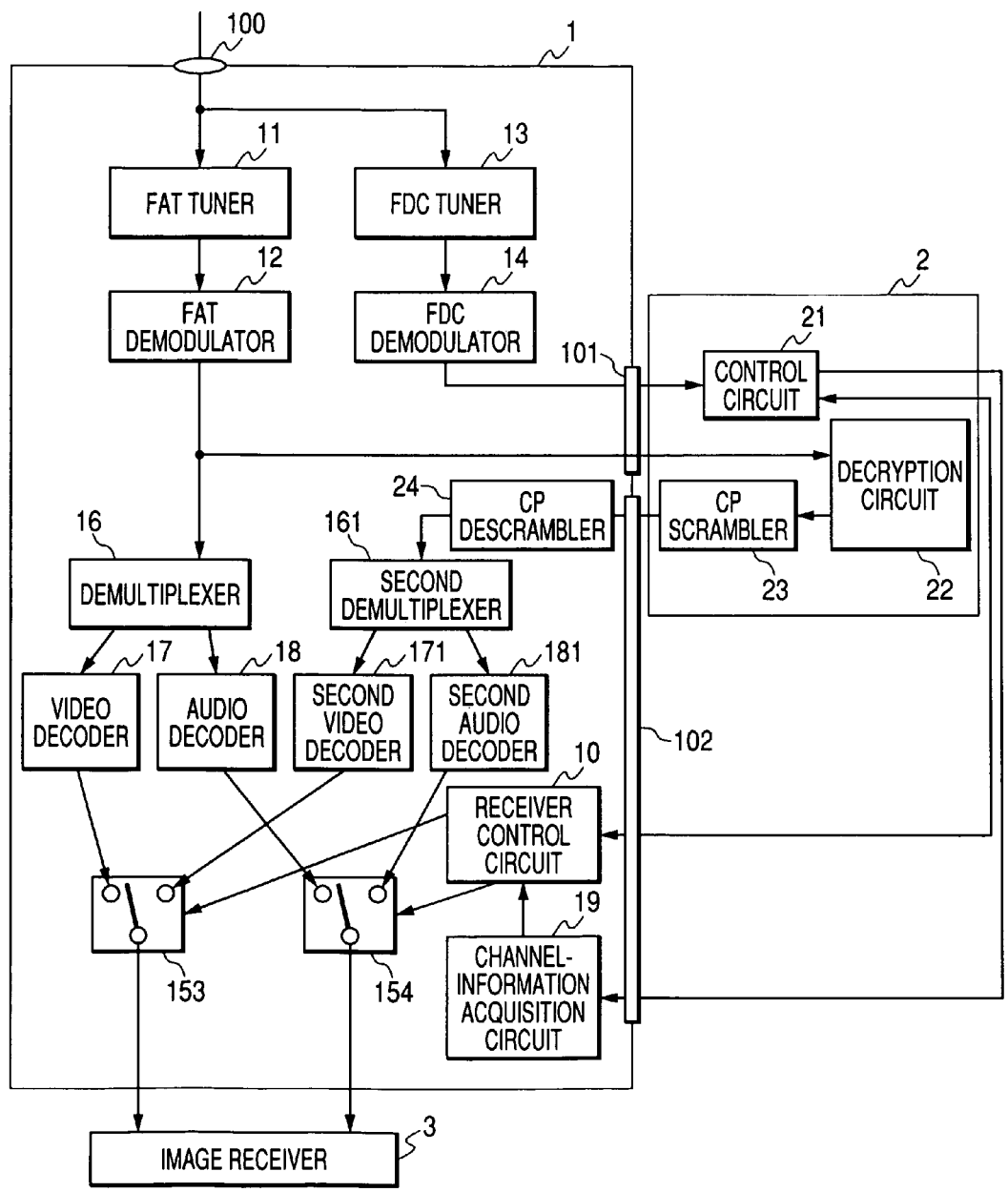
FIG. 3 is a diagram illustrating a third embodiment of the present invention.

Next, FIG. 3 is a block diagram schematically illustrating a configuration of a digital-stream control system according to a third embodiment of the present invention. In FIG. 3, the same circuits are designated by reference numerals similar to those in FIG. 2. Reference numeral 171 denotes a second video decoder; reference numeral 181 denotes a second audio decoder; reference numeral 153 denotes a video-signal switching circuit; and reference numeral 154 denotes an audio-signal switching circuit. A description will be made with reference to drawings as below.

In the third embodiment, decoded video and audio signals are switched according to whether or not a digital stream is CA-scrambled. If the channel in question is scrambled, the second demultiplexer 161 demultiplexes the digital stream into a video signal and an audio signal, which are supplied to the second video decoder 171 and the second audio decoder 181 respectively. The second video decoder 171 and the second audio decoder 181 decode the video signal and the audio signal respectively so as to output video and audio signals that can be viewed. Then, the receiver control circuit 10 controls the video-signal switching circuit 153 so that the signal decoded by the second video decoder 171 is selected, and also controls the audio-signal switching circuit 154 so that the signal decoded by the second audio decoder 181 is selected. At this time, because the digital stream supplied to the demultiplexer 16 is scrambled, the video decoder 17 and the audio decoder 18 cannot decode the digital stream. However, because signals output from the video decoder 17 and the audio decoder 18 are not selected as video and audio signals to be viewed, no particular problem arises.

On the other hand, if the channel in question is a clear channel that is not CA-scrambled, the receiver control circuit 10 controls the video-signal switching circuit 153 so that a video signal decoded by the video decoder 17 is selected, and also controls the audio-signal switching circuit 154 so that an audio signal decoded by the audio decoder 18 is selected. In this case, although the digital stream is supplied to the processing module 2, an output stream of the processing module 2 is not used by the receiver 1.

In addition, some of the circuits may also be formed on the same substrate. For example, the demultiplexer 16, the second demultiplexer 161, the video decoder 17, the second video decoder 171, the audio decoder 18, and the second audio decoder 181 may also be integrated as a component having a chip shape.

As described above, if a clear channel is selected, a digital stream which does not pass through the processing module 2 is demultiplexed and decoded. Accordingly, even if an error occurs in the processing module 2, no noise occurs in video and audio to be viewed. In addition, the CA-scrambled channel can be received and viewed in a manner similar to that of the conventional receiver.

In the first, second, and third embodiments, a program can be viewed without being conscious of whether or not the channel is CA-scrambled. To be more specific, once a contract to view a CA-scrambled channel is held, a program can be viewed without being conscious of whether or not the program is CA-scrambled, in other words, whether or not the program is a charged channel.

Fourth Embodiment

Figure 4:
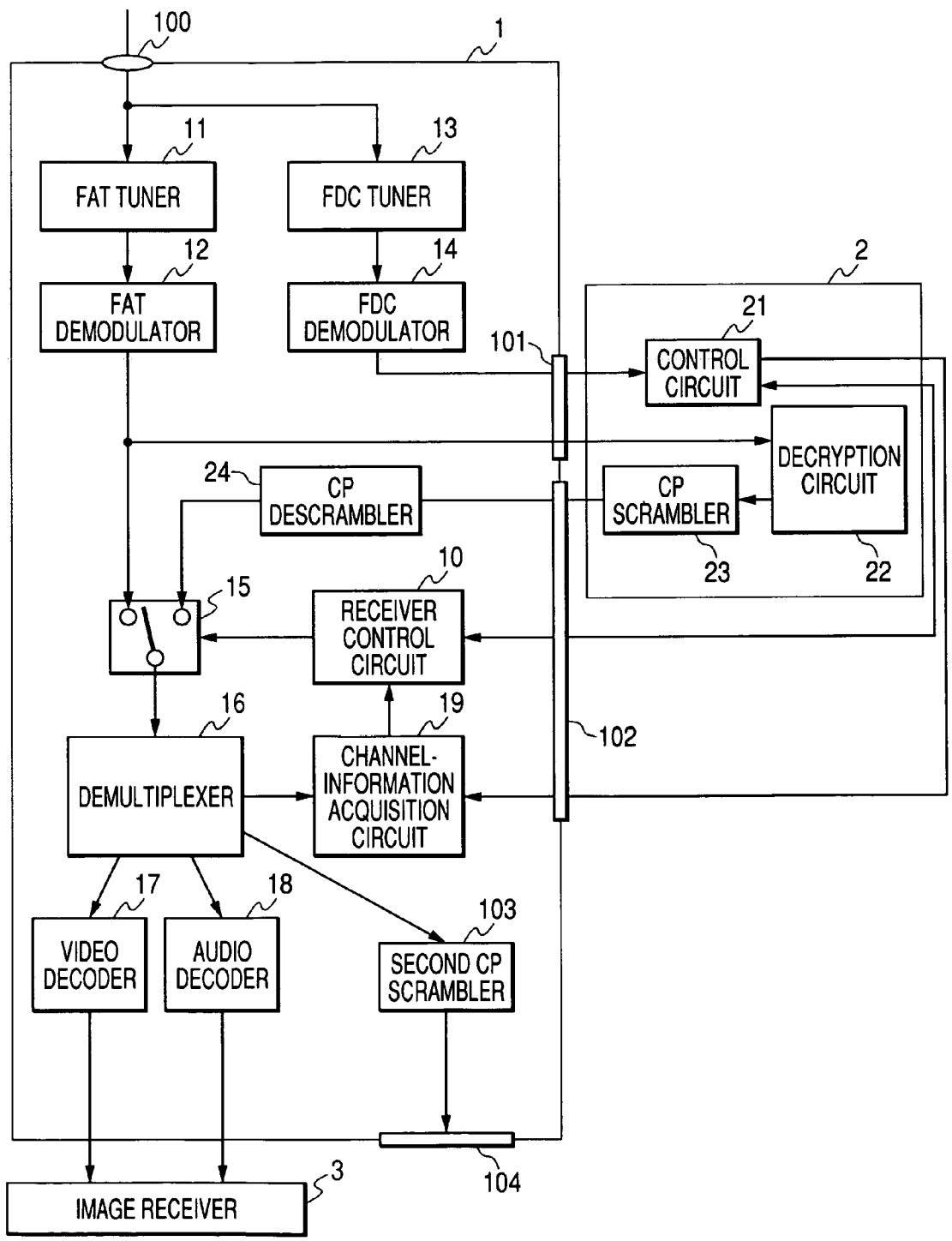
FIG. 4 is a diagram illustrating a fourth embodiment of the present invention.

Next, FIG. 4 is a diagram illustrating a configuration of a digital-stream control system according to a fourth embodiment. The digital-stream control systems according to the first, second, and third embodiments may further comprise a second CP scrambler 103, and an external-device connection terminal 104. In this embodiment, the second CP scrambler 103 scrambles video and audio signals that have been demultiplexed by the demultiplexer 16. The use of this scrambling is not limited to receiving. This is scrambling prescribed for transmission. The video and audio signals which have been scrambled are output to external devices through the external-device connection terminal 104. Here, the external devices are, for example, DVHSs and personal computers. The external devices also include personal recording media. Incidentally, in FIG. 4, components excluding the second CP scrambler 103 and the external-device connection terminal 104 are similar to those shown in FIG. 1.

As described above, because data output from the receiver to the external devices is kept scrambled, it is possible to prevent the data from being repeatedly viewed. Otherwise, the data is permitted to be freely written to recording media without being charged more than once.

Incidentally, if a user want to view a program that has been written with data thereof being kept scrambled, descramble processing is required on the external adapter side.

Fifth Embodiment

Figure 5:
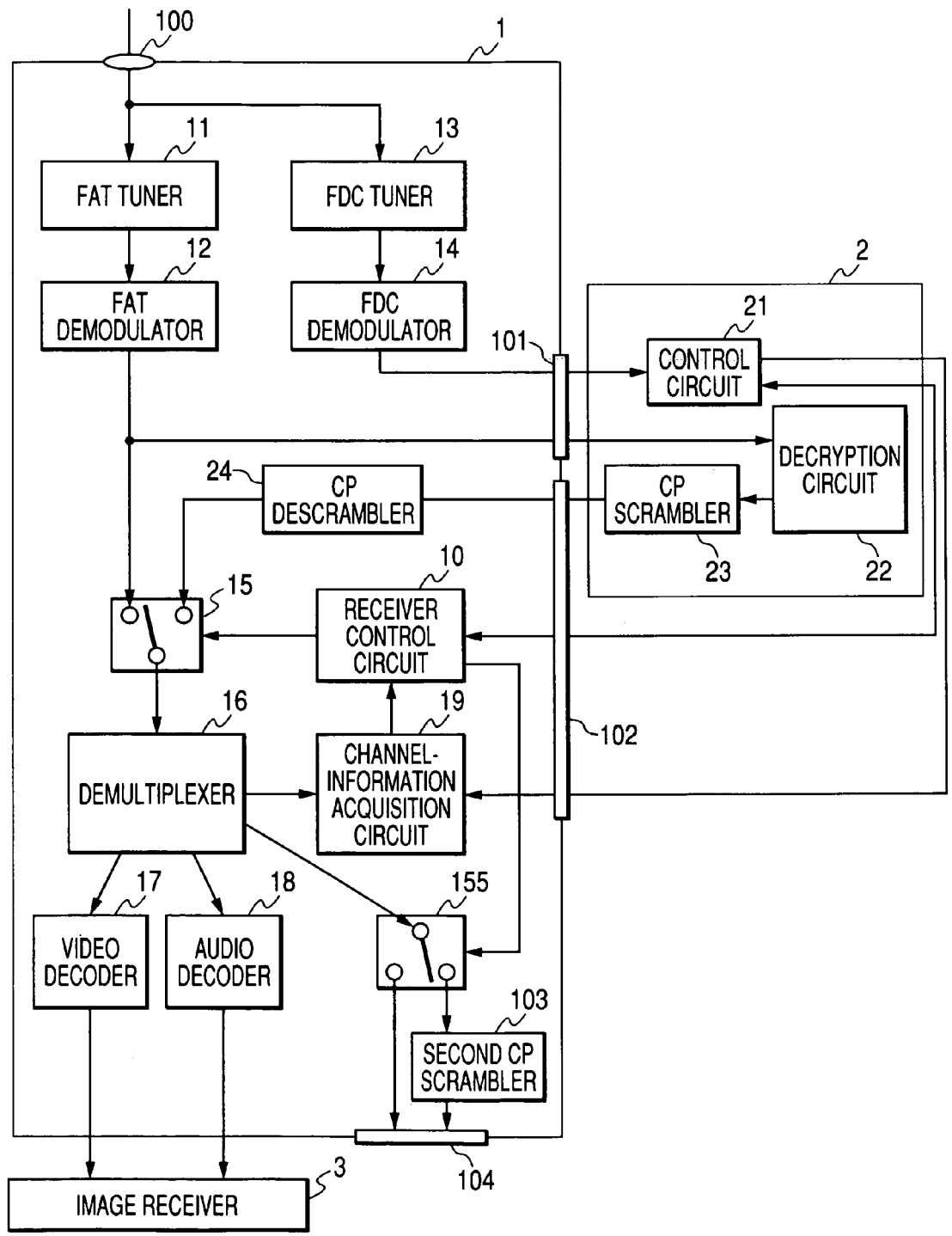
FIG. 5 is a diagram illustrating a fifth embodiment of the present invention.

FIG. 5 is a diagram illustrating a configuration of a digital-stream control system according to a fifth embodiment. The digital-stream control systems according to the first, second, and third embodiments may further comprise a switch 155, the second CP scrambler 103, and the external-device connection terminal 104. In this embodiment, video and audio signals which have been demultiplexed by the demultiplexer 16 are inputted into the switch 155. In the case of a channel that is CA-scrambled by the transmitting station, the receiver control circuit 10 controls the switch 155 so that demultiplexed video and audio signals are output to the CP scrambler 2103. In the case of a clear channel, the receiver control circuit 10 controls the switch 155 so that the demultiplexed video and audio signals are output to the external-device connection terminal 104. The video and audio signals which have been inputted into the second CP scrambler 103 are scrambled again before the video and audio signals are output to the external-device output unit 104. The use of this scrambling is not limited to receiving. This is scrambling prescribed for transmission. The video and audio signals are output to external devices through the external-device connection terminal 104. Here, the external devices are, for example, DVHSs and personal computers. The external devices also include personal recording media. Incidentally, in FIG. 5, components excluding the switch 155, the second CP scrambler 103, and the external-device connection terminal 104 are similar to those shown in FIG. 1. Incidentally, if a user want to view a program that has been written with data thereof being kept scrambled, descramble processing is required on the external adapter side.

In this embodiment, with respect to a CA-scrambled channel specified by the transmitting station, because data output from the receiver to the external devices is kept scrambled, it is possible to prevent the data from being repeatedly viewed. Otherwise, the data is permitted to be freely written to recording media without being charged more than once.

Moreover, in the above-mentioned embodiment, the image receiver 3 such as a television set and the receiver according to the present invention may also be integrated into one unit.

What is claimed is:

1. A receiver for receiving a broadcast signal that includes a program signal and an encryption information signal relating to the program signal, said receiver comprising:
   a FAT demodulator to demodulate the received program signal;
   a FDC demodulator to demodulate the received encryption information signal relating to the program signal;
   a first decryption circuit to decrypt the program signal received by the FAT demodulator;
   a detector to detect the encryption information signal relating to the program signal demodulated by the FDC demodulator;
   a streaming switch circuit to, on the basis of the encryption information signal relating to the program signal detected by the detector, selecting either the program signal coming from the FAT demodulator or the program signal coming from the decryption circuit; and
   a first decoder to decode output from the streaming switch circuit,
   wherein the FAT demodulator and the FDC demodulator are independent respectively;
   a second encryption circuit to encrypt the program signal output from the streaming switching circuit, the program signal being encrypted when the program signal is output to an external device; and
   an external-device output unit to output to the external device a signal encrypted by the second encryption circuit;
   on the basis of the encryption information of the program, said external-device output unit makes a judgment as to whether or not the program is scrambled, and if it is judged that the program is scrambled, the external-device output unit outputs a signal coming from the second encryption circuit, whereas if it is judged that the program is not scrambled, said external-device output unit outputs a signal output from the streaming switch circuit.

2. The receiver according to claim 1, said receiver further comprising:
   an encryption circuit to encrypt the program signal, which has been decrypted by the first decryption circuit, in a manner different from that at the time of broadcasting; and
   a second decryption circuit to decrypt the program signal encrypted by the encryption circuit.

3. The receiver according to claim 1, wherein:
   on the basis of the encryption information of the program signal detected by the detector, the streaming switch circuit makes a judgment as to whether or not the program signal is scrambled, and if it is judged that the program signal is scrambled, the streaming switch circuit outputs a program signal that has passed through the first decryption circuit, whereas if it is judged that the program signal is not scrambled, the streaming switch circuit outputs a program signal coming from the FAT demodulator.

4. The receiver according to claim 1, said receiver further comprising:
said receiver further comprising: a first demultiplexer to demultiplex the program signal output from the streaming switch circuit; and
an image receiver to display the program signal decoded by the first decoder,
wherein the first decoder decodes the program signal demultiplexed by the first demultiplexer.

5. The receiver according to claim 1, said receiver further comprising:
a second demultiplexer to demultiplex the program signal demodulated by the FAT demodulator; and
a third demultiplexer to demultiplex the program signal output from the first decryption circuit, wherein:
on the basis of the encryption information signal relating to the program signal, streaming switching circuit outputs either the program signal demultiplexed by the second demultiplexer or the program signal demultiplexed by the third demultiplexer.

6. The receiver according to claim 5, said receiver further comprising:
second decoder to decode the program signal demultiplexed by the second demultiplexer or the third demultiplexer to output the decoded program signal to the streaming switching circuit.

7. The receiver according to claim 6, said receiver further comprising:
an image receiver to display data that has been demultiplexed by the second demultiplexer or the third demultiplexer that has then been decoded by the second decoder.

8. The receiver according to claim 1, further comprising:
a channel information acquisition circuit to acquire scramble information about whether the program is scrambled;
a receiver control circuit configured to receive the scramble information from the channel information acquisition circuit, and control the streaming switching circuit to select either the program signal coming from the FAT demodulator or the program signal coming from the decryption circuit based on the scramble information.

9. A receiver for receiving a broadcast signal that includes a program signal and an encryption information signal relating to the program signal, said receiver comprising:
a FAT demodulator to demodulate the received program signal;
a FDC demodulator to demodulate the received encryption information signal relating to the program signal;
an output unit to output, to an external device, an output signal output from the FAT demodulator and an output signal output from the FDC demodulator;
an input unit to input a signal that includes the program signal coming from the external device, and an encryption information signal relating to the program signal;
a streaming switching circuit to, on the basis of the encryption information signal relating to the program signal that has been detected by the external device and has been inputted through the input unit, output either the program signal from the FAT demodulator or the program signal decoded in the external device, said decoded program signal coming from the external device and being inputted through the input unit; and
a decoder to decode output from the streaming switching circuit,
wherein the FAT demodulator and the FDC demodulator are independent respectively;
a second encryption circuit to encrypt the program signal output from the streaming switching circuit, the program signal being encrypted when the program signal is output to an external device; and
an external-device output unit to output to the external device a signal encrypted by the second encryption circuit;
on the basis of the encryption information of the program, said external-device output unit makes a judgment as to whether or not the program is scrambled, and if it is judged that the program is scrambled, the external-device output unit outputs a signal coming from the second encryption circuit, whereas if it is judged that the program is not scrambled, said external-device output unit outputs a signal output from the streaming switch circuit.

10. The receiver according to claim 9, wherein:
on the basis of the program encryption information inputted through the input unit, the streaming switch circuit makes a judgment as to whether or not the program is scrambled, and if it is judged that the program is scrambled, the streaming switch circuit outputs a decrypted signal inputted through the input unit, whereas if it is judged that the program is not scrambled, the streaming switch circuit outputs the program signal coming from the FAT demodulator.

11. The receiver according to claim 9, said receiver further comprising:
a second decryption circuit to decrypt the program signal inputted from the input unit, the program signal being encrypted in a manner different from that at the time of broadcasting.

12. The receiver according to claim 9, said receiver further comprising:
a demultiplexer to demultiplex the program signal output from the streaming switch circuit; and
an image receiver to display the program signal decoded by the decoder,
wherein the decoder decodes the program signal demultiplexed by the demultiplexer.

13. The receiver according to claim 9, said receiver further comprising:
a second encryption circuit to encrypt the signal output from the streaming switching circuit; and
an external-device output unit to output to the external device a signal encrypted by the second encryption circuit.

14. The receiver according to claim 13, wherein:
on the basis of the encryption information of the program, said external-device output unit makes a judgment as to whether or not the program is scrambled, and if it is judged that the program is scrambled, said external-device output unit outputs a signal coming from the second encryption circuit, whereas if it is judged that the program is not scrambled, said external-device output unit outputs a signal output from the streaming switching circuit.

15. A receiving method for receiving a broadcast signal that includes a program signal and an encryption information signal relating to the program signal, said receiving method comprising:
a first demodulating step, performed by a FAT demodulator, for demodulating the received program signal;

a second demodulating step, performed by a FDC demodulator, for demodulating the received encryption information signal relating to the program signal;

a decryption step, performed by a decryption circuit, for decrypting the signal demodulated in the first demodulating step;

a detecting step, performed by a detector, for detecting the encryption information signal relating to the program demodulated in the second demodulating step;

a selecting step, performed by a streaming switching circuit, for, on the basis of the encryption information signal relating to the program signal detected in the detecting step, selecting either the signal demodulated in the first demodulating step or the signal decrypted in the decryption step; and a decoding step, performed by a decoder, for decoding the selected signal in the selecting step, wherein the first demodulating step and the second demodulating step are executed independently respectively;

an encryption step, performed by a second encryption circuit, for encrypting the program signal output from the streaming switching circuit, the program signal being encrypted when the program signal is output to an external device; and an outputting step, performed by an external-device output unit, for outputting to the external device a signal encrypted by the second encryption circuit;

on the basis of the encryption information of the program, said external-device output unit makes a judgment as to whether or not the program is scrambled, and if it is judged that the program is scrambled, the external-device output unit outputs a signal coming from the second encryption circuit, whereas if it is judged that the program is not scrambled, said external-device output unit outputs a signal output from the streaming switch circuit.

16. The receiving method according to claim 15, wherein:

on the basis of the encryption information of the program signal detected in the detecting step, the selecting step makes a judgment as to whether or not the program signal is scrambled, and if it is judged that the program signal is scrambled, the selecting step outputs a program signal that has passed through the decryption step, whereas if it is judged that the program signal is not scrambled, the selecting step outputs a program signal demodulated at the first demodulating step.

17. A receiving method for receiving a broadcast signal that includes a program signal and an encryption information signal relating to the program signal, said receiving method comprising:

a first demodulating step, performed by a FAT demodulator, for demodulating the received program signal;

a second demodulating step, performed by a FDC demodulator, for demodulating the received encryption information signal relating to the program signal;

an outputting step for outputting, to an external device, the signal demodulated in the first demodulating step and the signal demodulated in the second demodulating step;

an inputting step for inputting a signal that includes the program signal coming from the external device, and an encryption information signal relating to the program signal; and a selecting step, performed by a streaming switching circuit, for, on the basis of the encryption information signal relating to the program signal that has been detected by the external device and has been inputted in the inputting step, selecting either the program signal demodulated in the first demodulating step or the program signal decrypted on the basis of the encryption information signal, the decrypted program signal coming from the external device and being inputted in the inputting step;

an encryption step, performed by a second encryption circuit, for encrypting the program signal output from the streaming switching circuit, the program signal being encrypted when the program signal is output to an external device; and an outputting step, performed by an external-device output unit, for outputting to the external device a signal encrypted by the second encryption circuit;

on the basis of the encryption information of the program, said external-device output unit makes a judgment as to whether or not the program is scrambled, and if it is judged that the program is scrambled, the external-device output unit outputs a signal coming from the second encryption circuit, whereas if it is judged that the program is not scrambled, said external-device output unit outputs a signal output from the streaming switch circuit.

18. The receiving method according to claim 17, wherein:

on the basis of the program encryption information inputted in the inputting step, the selecting step makes a judgment as to whether or not the program is scrambled, and if it is judged that the program is scrambled, the selecting step outputs a decrypted signal inputted in the inputting step, whereas if it is judged that the program is not scrambled, the selecting step outputs the program signal demodulated in the first demodulating step.

* * * * *

UNITED STATES PATENT AND TRADEMARK OFFICE
CERTIFICATE OF CORRECTION

PATENT NO.       : 7,590,241 B2
APPLICATION NO.  : 11/061746
DATED            : September 15, 2009
INVENTOR(S)      : Akiyama et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1096 days.

Signed and Sealed this

Twenty-first Day of September, 2010

David J. Kappos
*Director of the United States Patent and Trademark Office*